(12) United States Patent
Ekonen et al.

(10) Patent No.: US 11,365,795 B2
(45) Date of Patent: Jun. 21, 2022

(54) SELF ENERGIZING LOCKING DIFFERENTIAL

(71) Applicants: LINAMAR CORPORATION, Guelph (CA); Todd R Ekonen, Brighton, MI (US); Mitchell Holland, Royal Oak, MI (US); Sean Hayes, Farmington Hills, MI (US)

(72) Inventors: Todd R Ekonen, Brighton, MI (US); Mitchell Holland, Royal Oak, MI (US); Sean Hayes, Farmington Hills, MI (US)

(73) Assignee: Linamar Corporation, Guelph (CA)

( * ) Notice: Subject to any disclaimer, the term of this patent is extended or adjusted under 35 U.S.C. 154(b) by 0 days.

(21) Appl. No.: 17/270,104

(22) PCT Filed: Aug. 20, 2019

(86) PCT No.: PCT/US2019/047703
§ 371 (c)(1),
(2) Date: Feb. 22, 2021

(87) PCT Pub. No.: WO2020/041588
PCT Pub. Date: Feb. 27, 2020

(65) Prior Publication Data
US 2021/0199185 A1    Jul. 1, 2021

Related U.S. Application Data

(60) Provisional application No. 62/721,390, filed on Aug. 22, 2018.

(51) Int. Cl.
*F16H 48/22* (2006.01)
*F16H 48/34* (2012.01)
(Continued)

(52) U.S. Cl.
CPC ............. *F16H 48/22* (2013.01); *F16H 48/34* (2013.01); *F16H 48/24* (2013.01); *F16H 2048/082* (2013.01); *F16H 2048/346* (2013.01)

(58) Field of Classification Search
None
See application file for complete search history.

(56) References Cited

U.S. PATENT DOCUMENTS 3,439,785 A * 4/1969 Hughson ................. F16H 48/22
192/221
5,030,181 A * 7/1991 Keller ..................... F16H 48/30
475/150
(Continued)

FOREIGN PATENT DOCUMENTS

| CN | 108343722 | 7/2018 |
| WO | 2017034691 | 7/2016 |

*Primary Examiner* — Ernesto A Suarez
*Assistant Examiner* — James J Taylor, II
(74) *Attorney, Agent, or Firm* — Miller Canfield

(57) ABSTRACT

A locking differential assembly includes a differential case, a first output shaft and a second output shaft. A first side gear is non-rotatably coupled to the first output shaft and a second side gear is non-rotatably coupled to the second output shaft. A differential pin is also included, the differential pin having differential gears. The differential gears are rotatably supported by the differential case and drivingly engaged with the first and second side gears to allow differential rotation thereof. A lock mechanism is actuated when a first torque force is applied to a drive cam and a driven cam. Finally, an electromagnetic coil actuates a brake plate, wherein the brake plate comes into frictional with a brake disc. Furthermore, the electromagnetic coil is discontinuous around the circumference of the brake disc.

28 Claims, 3 Drawing Sheets

(51) Int. Cl.
*F16H 48/08* (2006.01)
*F16H 48/24* (2006.01)

(56) References Cited

U.S. PATENT DOCUMENTS

| | | |
|---|---|---|
| 5,158,507 A | 10/1992 | Guimbretiere |
| 9,657,827 B2 * | 5/2017 | Gopal .................... F16H 48/24 |
| 11,015,690 B2 * | 5/2021 | Ling ....................... F16H 48/30 |
| 2005/0034936 A1 * | 2/2005 | Drennen ................. F16D 65/18 |
| | | 188/72.8 |
| 2008/0042791 A1 | 2/2008 | York et al. |
| 2019/0331206 A1 * | 10/2019 | Yudell .................... F16H 48/22 |

* cited by examiner

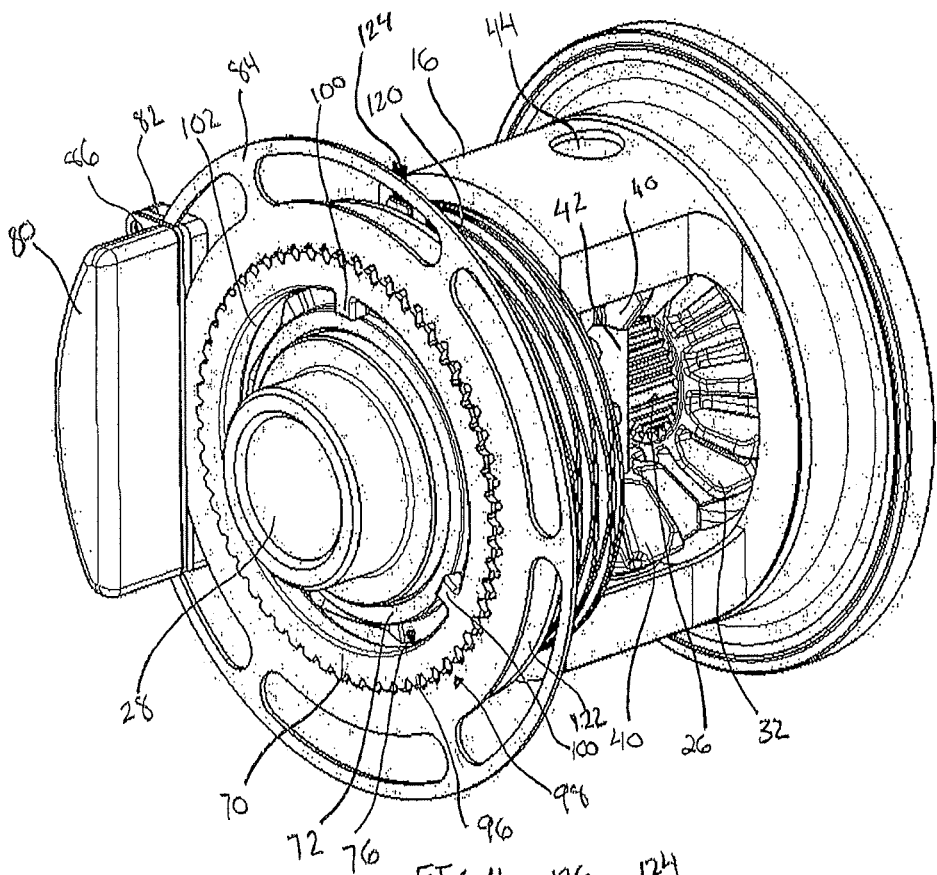
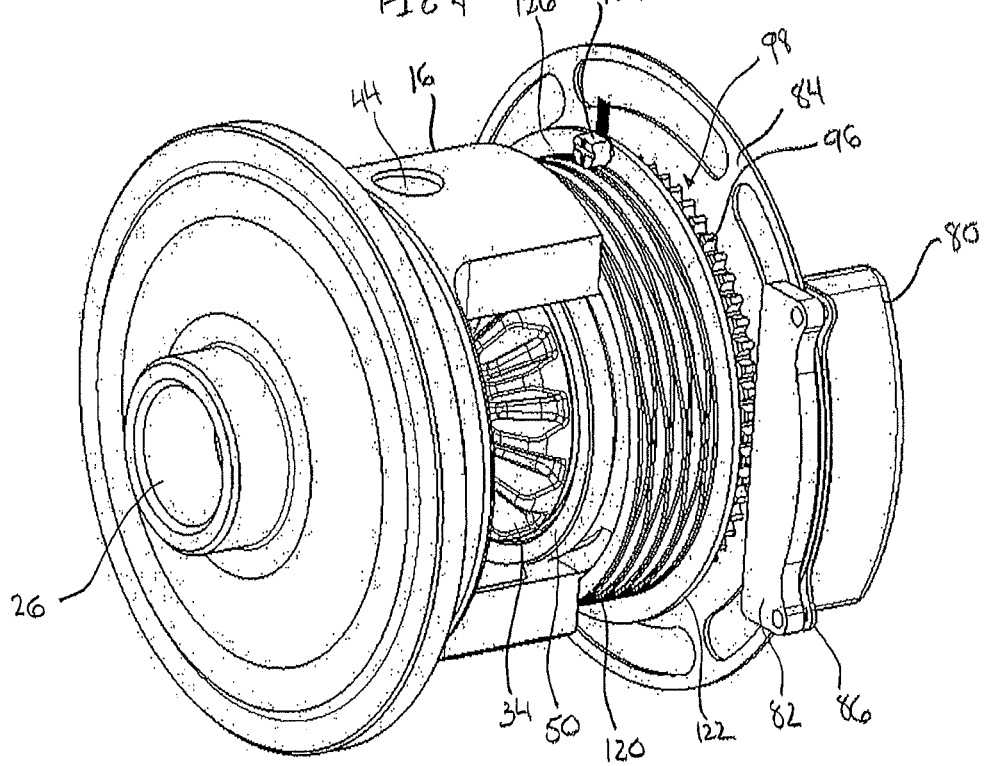

SELF ENERGIZING LOCKING DIFFERENTIAL

CROSS REFERENCE TO RELATED APPLICATIONS

This application claims priority of U.S. Provisional Patent Application No. 62/721,390, filed Aug. 22, 2018, the disclosure of which is incorporated herein by reference in its entirety

BACKGROUND OF THE INVENTION

The present invention relates to a differential assembly, and more particularly to a locking differential assembly for motor vehicles, having an electromagnetically actuated locking mechanism.

SUMMARY OF THE INVENTION

According to the invention, a locking differential assembly includes a differential case defining an axis of rotation, a first output shaft, and a second output shaft. The first output shaft and second output shaft extend out and away from a central axis of the differential case in opposite directions in relation to one another, and rotate about the axis of rotation. Further included is a first side gear non-rotatably coupled to the first output shaft and a second side gear non-rotatably coupled to the second output shaft. Each side gear is arranged coaxially and rotatable relative to the differential case. A differential pin is also included, the differential pin having differential gears. The differential gears are rotatably supported by the differential case and drivingly engaged with the first and second side gears to allow differential rotation thereof. Also included is a locking mechanism, the locking mechanism prevents differential rotation when in a locked position. The locking mechanism is actuated when a first torque force is applied to a drive cam and a driven cam. Finally included is an electromagnetic coil. The electromagnetic coil actuates a brake plate, the brake plate comes into frictional contact with a brake disc.

According to another aspect of the invention, a locking differential assembly includes a differential case defining an axis of rotation, a first output shaft, and a second output shaft. The first output shaft and second output shaft extend out and away from a central axis of the differential case in opposite directions in relation to one another, and rotate about the axis of rotation. Further included is a first side gear non-rotatably coupled to the first output shaft and a second side gear non-rotatably coupled to the second output shaft. Each side gear is arranged coaxially and rotatable relative to the differential case. A differential pin is also included, the differential pin having differential gears. The differential gears are rotatably supported by the differential case and drivingly engaged with the first and second side gears to allow differential rotation thereof. Further included is a locking mechanism using a dog clutch mechanism. The locking mechanism prevents differential rotation when in a locked position. The locking mechanism is located between the differential case and at least one of the first and second side gears. The locking mechanism is actuated when a first torque force generated from a first torque source is applied to a drive cam and a driven cam. Finally included is an electromagnetic coil. The electromagnetic coil actuates a brake plate. The brake plate comes into frictional contact with a brake disc. The friction creates a second torque force which is an opposing torque force to the first torque force. Furthermore the electromagnetic coil is discontinuous around a circumference of the brake disc.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a perspective right side view of the locking differential assembly of FIG. 1.

FIG. 4 is a perspective left side view of the locking differential assembly of FIG. 1 specifically in the locked position.

DETAILED DESCRIPTION OF THE PREFERRED EMBODIMENTS

Referring now to the Figures, where the invention will be described with reference to specific embodiments, without limiting same, wherein like numerals indicate like or corresponding parts throughout the several views.

Figure 1:
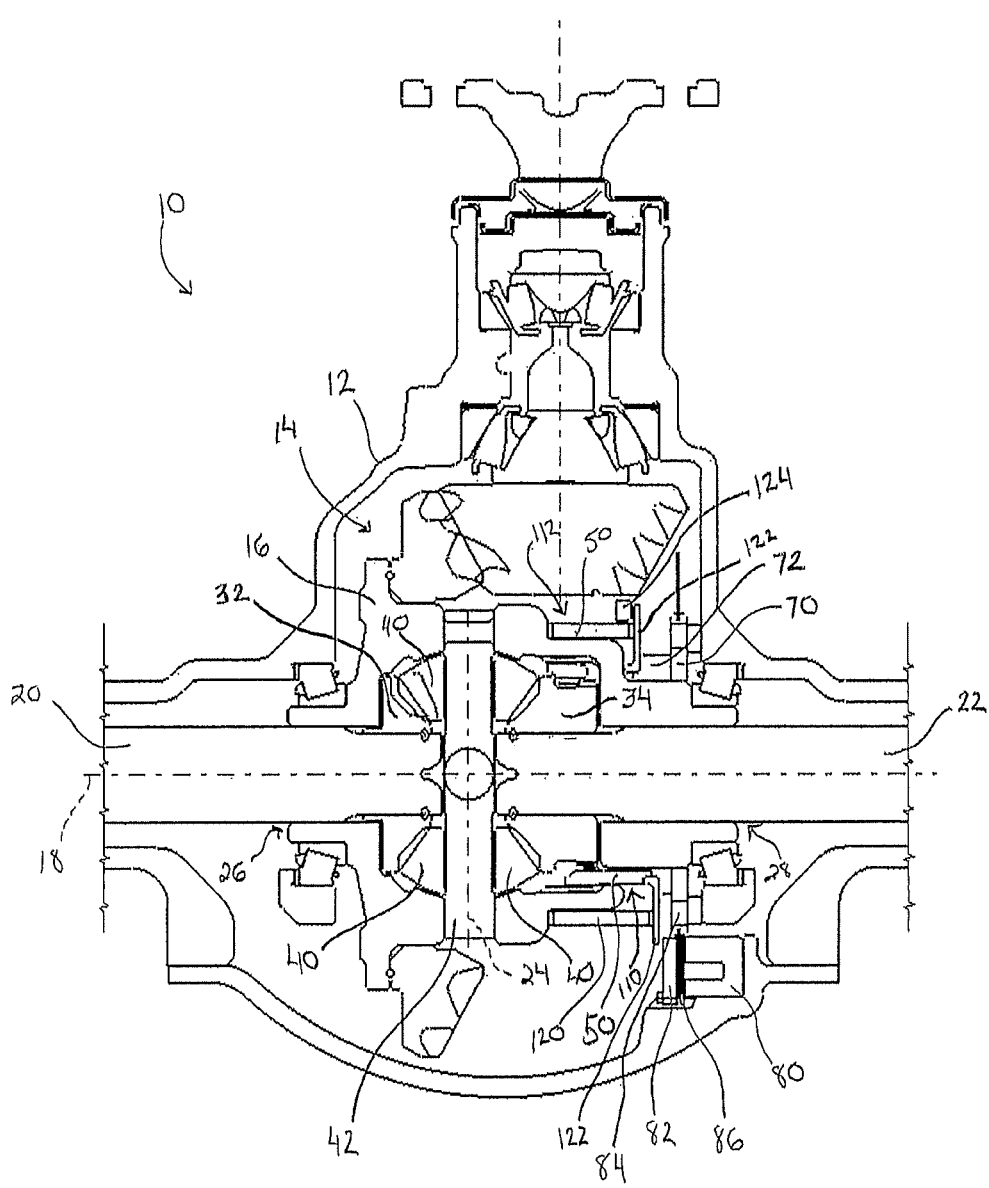
FIG. 1 is a transverse cross-sectional view of a locking differential assembly in accordance with an embodiment of the invention in both a locked and unlocked position.
Figure 2:
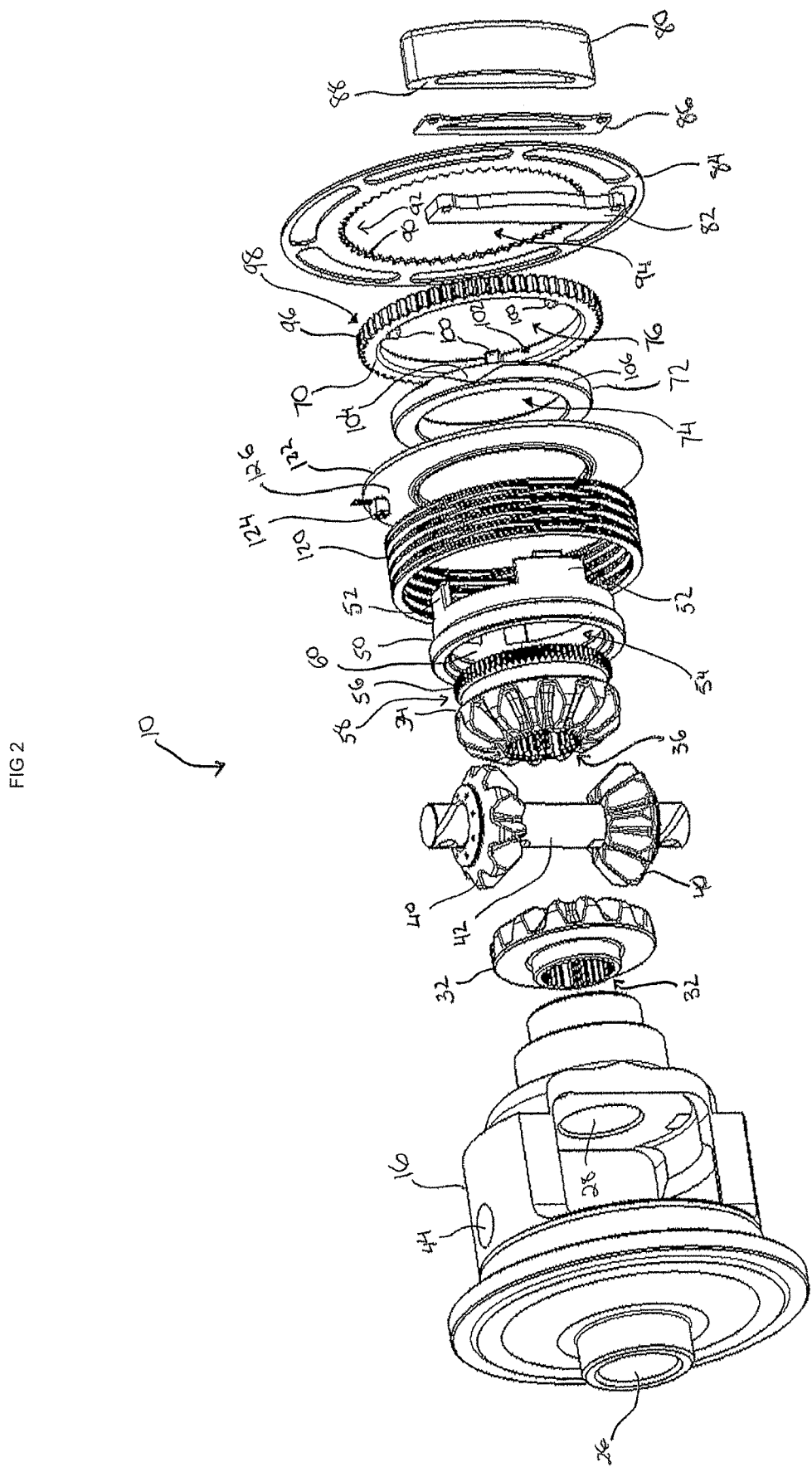
FIG. 2 is an exploded view in perspective showing certain parts associated with the locking differential assembly.

Referring to FIGS. 1 and 2, a transverse cross-sectional view of a locking differential assembly 10 is shown in FIG. 1. FIG. 2 is an exploded view in perspective showing certain parts associated with the locking differential assembly 10 in FIG. 1. The locking differential assembly 10 includes a differential housing 12. The differential housing 12 is used to firmly mount the locking differential assembly 10 within a motor vehicle (not shown). The differential housing has a cavity 14 containing a differential case 16.

The differential case 16 defines an axis of rotation 18 about which a first output shaft 20 and a second output shaft 22 rotate. The first output shaft 20 and the second output shaft 22 extend out and away from a central axis 24 of the differential case 16 in opposite directions in relation to one another. The first output shaft 20 is depicted extending out through a first opening 26 of the differential case 16 and the second output shaft 22 extending out through a second opening 28 of the differential case 16.

The first output shaft 20 also passes through a central opening 30 of a first side gear 32 (See FIG. 2). The first side gear 32 is non-rotatably coupled to the first output shaft 20, and is located within the cavity 14 of the differential case 16 near the central axis 24. A second side gear 34 is located opposite the central axis 24 of the differential case 16 in relation to the first side gear 32. The second output shaft 22 passes through a central opening 36 of the second side gear 34 (See FIG. 2). The second side gear 34 is non-rotatably coupled to the second output shaft 22. The first side gear 32 and second side gear 34 are arranged coaxially and are rotatable relative to the differential case 16.

The first side gear 32 and second side gear 34 are drivingly engaged with a set of differential gears 40 located on a differential pin 42. The differential gears 40 of the differential pin 42 are supported by the differential case 16. Engagement between the first side gear 32, second side gear 34, and differential gears 40 of the differential pin 42 allow for differential rotation of the first output shaft 20 and second output shaft 22. The differential pin 42 is supported by differential pin openings 44 found on opposite ends of the differential case 16.

In a scenario where there is a need to prevent differential rotation of the first output shaft 20 and second output shaft 22 a lock mechanism 50 is used. The lock mechanism 50 uses a dog clutch mechanism 52 to lock the locking differential assembly 10. It is understood in other embodiments the lock mechanism 50 may use other means for locking the locking differential assembly 10. The lock mechanism 50 of the locking differential assembly 10 is located between the second side gear 34 and the differential case 16. In other embodiments the lock mechanism may be located between the first side gear 32 and the differential case 16. The lock mechanism 50 also has a central opening 54 through which the second output shaft 22 passes through (See FIG. 2).

The second side gear 34 of the locking differential assembly 10 has a set of splines 56 on an outer surface 58 which engage with an inner wall 60 of the central opening 54 of the lock mechanism 50 when the lock mechanism 50 is actuated. The lock mechanism 50 is actuated when a first torque force from the differential case 16 is applied to a drive cam 70 and a driven cam 72. The driven cam 72 includes a central opening 74 through which the second output shaft 22 passes through (See FIG. 2).

When the first torque force is applied to the drive cam 70 and the driven cam 72 the lock signal is sent to a electromagnet coil 80 which then generates a second torque force. The second torque force is generated by the electromagnetic coil 80 magnetically pulling an armature 82 axially against a brake disc 84. The electromagnetic coil 80 applies pressure against a brake plate 86. The break plate 86 is located between an inner surface 88 of the electromagnetic coil 80 and the break disc 84. The break disc 84 is sandwiched between the armature 82 and the break plate 86. Both the break plate 86 and electromagnetic coil 80 may be discontinuous around the circumference of the brake disc 84. When a lock signal is sent, the brake disc 84 comes into frictional contact with the brake plate 86.

The friction between the brake plate 86 and the brake disc 84 generates the second torque force. The second torque force generated from this interaction is opposite the first torque force generated by the differential case 16. The second torque force is then transferred from the brake disc 84 to the drive cam 70 of the locking differential assembly 10.

The transfer of torque between the brake disc 84 and the drive cam 70 occurs between a first set of teeth 90 located on an inner radial surface 92 about a central opening 94 of the brake disc 84 (See FIG. 2), and a second set of teeth 96 on an outer radial surface 98 of the drive cam 70 (See FIG. 2). The first set of teeth 90 of the brake disc 84 and the second set of teeth 96 of the drive cam 70 are interlocked when the locking differential assembly 10 is fully assembled allowing for the transfer of the second torque force generated by the brake plate 86 and brake disc 84.

The relative motion of the drive cam 70 is then transferred to a driven cam 72 of the locking differential assembly 10. The driven cam 72 is located within a central opening 76 of the drive cam 70 (See FIG. 2). The relative motion of the drive cam 70 is transferred through the interaction of a first set of members 100 located along an inner radial surface 102 of the drive cam 70 and a second set of members 104 located along an outer radial surface 106 of the driven cam 72 (See FIG. 2).

In the depicted embodiment the first set of members 100 are depicted as being small protrusions along the inner radial surface 102 of the drive cam 70. While the second set of members 104 are shown being a set of notches along the outer radial surface 106 of the driven cam 72 (See FIG. 2). It is understood the first set of members 100 and second set of members 104 may vary in shape, size, and or placement along the inner radial surface 102 and outer radial surface 106 of the drive cam 70 and driven cam 72.

The interaction between the set of first members 100 and the set of second members 104 creates a minimum prevailing torque requirement before they slip to improve the stability of the position of the lock mechanism 50. This interaction makes the system bi-stable meaning no input is required to remain in a locked position 110 or an unlocked position 112 as shown in FIG. 1.

The locking differential assembly 10 further includes an applying spring 120 and a spring plate 122. The spring plate 122 includes a position sensor 124. The position sensor 124 is mounted to a first side 126 of the spring plate 122. The position sensor 124 detect movement of the spring plate 122. Once the lock mechanism 50 has been actuated the position sensor 124 detects a change in position of the spring plate 122 causing the actuation signal to the electromagnetic coil 80 to be cut off.

The applying spring 120 is used to hold a locking pressure on the lock mechanism 50 in the event that the dog clutch mechanism 52 of the lock mechanism 50 is out of phase and unable to be locked while the system is actuated. This locking pressure generated by the applying spring 120 allows the lock mechanism 50 to be lockable once the dog clutch mechanism 52 is in phase without holding the lock signal on the electromagnetic coil 80.

The spring plate 122 transfers axial force from the applying spring 120 to the lock mechanism 50. The spring plate 122 also transfers the first torque force from the lock mechanism 50 to the driven cam 72.

Referring specifically to the top half of FIG. 1 the lock mechanism 50 is shown in the unlocked position 112 and in the bottom half of FIG. 1 the lock mechanism 50 is shown in the locked position 110. When the locking differential assembly 10, is locked the applying spring 120 pushes on the spring plate 122, which in turn pulls the lock mechanism 50 into engagement with the splines 56 of the second side gear 34. Simultaneously, the apply spring 120 is constantly pushing the driven cam 72 into the drive cam 70 causing the first set of members 100 of the drive cam 70 to be engaged with the second set of members 104 of the driven cam 72. The electromagnetic coil 80 is energized creating the second torque force. Once the lock mechanism 50 has been actuated the sensor detects a change in position of the spring plate 122 causing the actuation signal to the electromagnetic coil 80 to be cut off.

Referring to FIGS. 3 and 4, a perspective right side view (See FIG. 3) and left side view (See FIG. 4) of the locking differential assembly of FIG. 1 are shown. When fully assembled the interaction between the brake disc 84 and the drive cam 70 occurring between the first set of teeth 90 located on the inner radial surface 92 (See FIG. 2) about the central opening 84 (See FIG. 2) of the brake disc 84, and the second set of teeth 96 on the outer radial surface 98 (See FIG. 2) of the drive cam 70 is more clear.

The electromagnetic coil 80, brake plate 86, and armature 82 are shown assembled around the brake disc 84. The brake disc 84 is passing between the brake plate 86 and the armature 82. The electromagnetic coil 80 in the depicted embodiment is discontinuous around the circumference of the brake disc 84.

The differential pin 42 is shown inserted through the differential pin openings 44 on the differential case 16. The differential gears 40 of the differential pin 42 are shown engaging with the first side gear 32 (See FIG. 3). The second side gear 34 is shown specifically in FIG. 4 with the system being in a locked position 110 after it has been pulled into the central opening 54 (See FIG. 2) of the lock mechanism 50.

The applying spring 120 is shown wrapped around the lock mechanism 50 with the spring plate 122 located between the applying spring 120 and combination of the driven cam 72, the drive cam 70, and the brake disc 84. The position sensor 124 is also shown mounted to the first side 126 of the spring plate 122 (See FIG. 4).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A locking differential assembly comprising:
   a differential case defining an axis of rotation and a central axis generally perpendicular to the axis of rotation;
   a first output shaft and a second output shaft, the first output shaft and second output shaft extending out and away from the central axis of the differential case in opposite directions in relation to one another, and rotating about the axis of rotation;
   a first side gear non-rotatably coupled to the first output shaft and a second side gear non-rotatably coupled to the second output shaft, each side gear arranged coaxially and rotatable relative to the differential case;
   a differential pin, having differential gears, the differential gears rotatably supported by the differential case and drivingly engaged with the first and second side gears to allow differential rotation thereof;
   a lock mechanism, operable to prevent differential rotation when in a locked position, the lock mechanism being actuated when a first torque force from a first torque source is applied to a drive cam and a driven cam; and
   an electromagnetic coil, actuating a brake plate, the brake plate coming into frictional contact with a brake disc for actuating the lock mechanism to the locked position and preventing differential rotation of the first and second output shafts, wherein the electromagnetic coil receives a lock signal, the electromagnetic coil magnetically pulling an armature against the brake disc actuating the brake plate, and the brake plate coming into frictional contact with the brake disc.

2. The locking differential assembly of claim 1, wherein relative motion of the drive cam is transferred to the driven cam actuating the lock mechanism.

3. The locking differential assembly of claim 2, wherein the relative motion of the drive cam is transferred via an interaction between a set of first members located on an inner surface of the drive cam and a set of second members located on a first end of the driven cam.

4. The locking differential assembly of claim 2, wherein an interaction between a set of first members and a set of second members creates a minimum prevailing torque requirement before they slip to improve the stability of a position of the lock mechanism.

5. The locking differential assembly of claim 1, wherein the lock mechanism is located between the differential case and at least one of the first and second side gears.

6. The locking differential assembly of claim 1, wherein the second side gear has an outer circumference with a set of splines, the splines engaging with an inner wall of a central opening of the lock mechanism when the lock mechanism is in the locked position.

7. The locking differential assembly of claim 1, wherein the first torque source is the differential case, the differential case transferring torque to the lock mechanism, the lock mechanism transferring torque to the driven cam, and the driven cam transferring torque to the drive cam.

8. The locking differential assembly of claim 1, wherein a second torque force is created when the lock signal is sent to the electromagnetic coil, the second torque force being opposite the first torque force.

9. The locking differential assembly of claim 1, wherein the electromagnetic coil is discontinuous around a circumference of the brake disc.

10. The locking differential assembly of claim 1, wherein the brake disc has an inner diameter with a first set of teeth, the first set of teeth being interlocked with a second set of teeth on an outer diameter of the drive cam, a second torque force being transferred from the brake disc to the drive cam through the interlocked sets of teeth.

11. The locking differential assembly of claim 1, wherein the lock mechanism uses a dog clutch mechanism.

12. The locking differential assembly of claim 1, wherein the locking differential assembly further includes an applying spring and a spring plate, the spring plate having a position sensor.

13. The locking differential assembly of claim 12, wherein the applying spring is used to hold a locking pressure on the lock mechanism in the event that a dog clutch mechanism of the lock mechanism is out of phase and unable to be locked while the dog clutch mechanism is actuated, the lock mechanism being lockable once the dog clutch mechanism is in phase without holding the lock signal on the electromagnetic coil.

14. The locking differential assembly of claim 12, wherein a position of the lock mechanism is tracked by the position sensor of the spring plate.

15. The locking differential assembly of claim 12, wherein the spring plate transfers axial force from the applying spring to the lock mechanism.

16. The locking differential assembly of claim 12, wherein the spring plate transfers the first torque force from the lock mechanism to the driven cam.

17. A locking differential assembly comprising:
   a differential case defining an axis of rotation;
   a first output shaft and a second output shaft, the first output shaft and second output shaft extending out and away from a central axis of the differential case in opposite directions in relation to one another, and rotating about the axis of rotation;
   a first side gear non-rotatably coupled to the first output shaft and a second side gear non-rotatably coupled to the second output shaft, each side gear arranged coaxially and rotatable relative to the differential case;

a differential pin, the differential pin having differential gears, the differential gears rotatably supported by the differential case and drivingly engaged with the first and second side gears to allow differential rotation thereof;

a lock mechanism using a dog clutch mechanism, the lock mechanism preventing differential rotation when in a locked position, the lock mechanism being located between the differential case and at least one of the first and second side gears, the lock mechanism being actuated when a first torque force generated from the differential case is applied to a drive cam and a driven cam; and an electromagnetic coil, the electromagnetic coil actuating a brake plate, the brake plate coming into frictional contact with a brake disc, the friction creating a second torque force, the second torque force being an opposing torque force to the first torque force, the electromagnetic coil being discontinuous around a circumference of the brake disc, wherein the second torque force is generated when a lock signal is sent to the electromagnetic coil, the electromagnetic coil magnetically pulling an armature against the brake disc actuating the brake plate, the brake plate coming into frictional contact with the brake disc.

18. The locking differential assembly of claim 17, wherein the second side gear has an outer circumference with a set of splines, the splines engaging with an inner wall of a central opening of the lock mechanism when the lock mechanism is in the locked position.

19. The locking differential assembly of claim 17, wherein the differential case transfers the first torque force to the lock mechanism, the lock mechanism transferring the first torque force to the driven cam, and the driven cam transferring the first torque force to the drive cam.

20. The locking differential assembly of claim 17, wherein relative motion of the drive cam is transferred to the driven cam actuating the lock mechanism.

21. The locking differential assembly of claim 17, wherein relative motion of the drive cam is transferred via an interaction between a set of first members located on an inner surface of the drive cam and a set of second members located on a first end of the driven cam.

22. The locking differential assembly of claim 21, wherein the interaction between the set of first members of the drive cam and the set of second members of the driven cam creates a minimum prevailing torque requirement before they slip improving the stability of a position of the lock mechanism.

23. The locking differential assembly of claim 17, wherein the drive cam has an outer diameter with a second set of teeth, the second set of teeth being interlocked with a first set of teeth on an inner diameter of the brake disc, the second torque force being transferred from the brake disc to the drive cam through the interlocked sets of teeth.

24. The locking differential assembly of claim 17, wherein the locking differential assembly further includes an applying spring and a spring plate, the spring plate having a position sensor.

25. The locking differential assembly of claim 24, wherein the spring plate transfers axial force from the applying spring to the lock mechanism.

26. The locking differential assembly of claim 24, wherein the spring plate transfers the first torque force from the lock mechanism to the driven cam.

27. The locking differential assembly of claim 24, wherein the applying spring is used to hold a locking pressure on the lock mechanism in the event that the dog clutch mechanism of the lock mechanism is out of phase and unable to be locked while the dog clutch mechanism is actuated, the lock mechanism being lockable once the dog clutch mechanism is in phase without holding the lock signal on the electromagnetic coil.

28. The locking differential assembly of claim 24, wherein a position of the lock mechanism is tracked by the position sensor of the spring plate.

* * * * *